(12) United States Patent
Yan et al.

(10) Patent No.: US 11,620,359 B2
(45) Date of Patent: Apr. 4, 2023

(54) METHOD, DEVICE, AND COMPUTER PROGRAM PRODUCT FOR SELF-SUPERVISED LEARNING OF PIXEL-WISE ANATOMICAL EMBEDDINGS IN MEDICAL IMAGES

(71) Applicant: Ping An Technology (Shenzhen) Co., Ltd., Shenzhen (CN)

(72) Inventors: Ke Yan, Bethesda, MD (US); Jinzheng Cai, Bethesda, MD (US); Youbao Tang, Bethesda, MD (US); Dakai Jin, Bethesda, MD (US); Shun Miao, Bethesda, MD (US); Le Lu, Bethesda, MD (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 275 days.

(21) Appl. No.: 17/208,128

(22) Filed: Mar. 22, 2021

(65) Prior Publication Data
US 2022/0180126 A1 Jun. 9, 2022

Related U.S. Application Data

(60) Provisional application No. 63/120,776, filed on Dec. 3, 2020.

(51) Int. Cl.
*G06F 18/214* (2023.01)
*G06T 7/70* (2017.01)
(Continued)

(52) U.S. Cl.
CPC ........ *G06F 18/2155* (2023.01); *G06F 18/213* (2023.01); *G06N 3/08* (2013.01);
(Continued)

(58) Field of Classification Search
CPC ..... G06F 18/2155; G06F 18/213; G06T 7/70; G06T 7/0014; G06T 2207/20081;
(Continued)

(56) References Cited

U.S. PATENT DOCUMENTS

| | | | |
|---|---|---|---|
| 2009/0125544 A1* | 5/2009 | Brindley | G06F 16/958 707/999.102 |
| 2015/0262372 A1* | 9/2015 | Cardoso | G06F 18/22 382/131 |
| 2022/0014807 A1* | 1/2022 | Lin | G06V 10/764 |

\* cited by examiner

*Primary Examiner* — Wednel Cadeau
(74) *Attorney, Agent, or Firm* — Anova Law Group, PLLC

(57) ABSTRACT

The present disclosure provides a method, a device, and a computer program product using a self-supervised anatomical embedding (SAM) method. The method includes randomly selecting a plurality of images; for each image of the plurality of images, performing random data augmentation to obtain a patch pair, generating global and local embedding tensors for each patch of the patch pair, and selecting positive pixel pairs from the patch pair and obtaining positive embedding pairs; for each positive pixel pair, computing global and local similarity maps, finding global hard negative embeddings, selecting global random negative embeddings, pooling the global hard negative embeddings and the global random negative embeddings to obtain final global negative embeddings, and finding local hard negative embeddings using the global and local similarity maps, and randomly sampling final local negative embeddings from the local hard negative embeddings; and minimizing a final info noise contrastive estimation (InfoNCE) loss.

17 Claims, 10 Drawing Sheets

(51) Int. Cl.
*G06N 3/08* (2023.01)
*G06T 7/00* (2017.01)
*G06V 30/262* (2022.01)
*G06F 18/213* (2023.01)

(52) U.S. Cl.
CPC .............. *G06T 7/0014* (2013.01); *G06T 7/70* (2017.01); *G06V 30/274* (2022.01); *G06T 2207/20081* (2013.01); *G06T 2207/20084* (2013.01); *G06T 2207/30004* (2013.01)

(58) Field of Classification Search
CPC ........... G06T 2207/20084; G06T 2207/30004; G06V 30/274; G06N 3/08
See application file for complete search history.

METHOD, DEVICE, AND COMPUTER PROGRAM PRODUCT FOR SELF-SUPERVISED LEARNING OF PIXEL-WISE ANATOMICAL EMBEDDINGS IN MEDICAL IMAGES

CROSS-REFERENCE TO RELATED APPLICATION

This application claims the priority of U.S. Provisional Patent Application No. 63/120,776, filed on Dec. 3, 2020, the entire content of which is incorporated herein by reference.

FIELD OF THE DISCLOSURE

The present disclosure generally relates to the field of machine learning technology and, more particularly, relates to a method, a device, and a computer program product for self-supervised learning of pixel-wise anatomical embeddings in medical images.

BACKGROUND

A fundamental task in medical image analysis is to locate a same anatomical or semantic structure across different images, which may be addressed by organ segmentation or anatomical landmark detection methods. However, most supervised methods need sufficient labeled data for training. Annotating medical images is laborious, expensive, and requires considerable expertise. Moreover, supervised methods are restricted to only discovering organs or landmarks that may be a priori labelled, but a large number of labeled datasets are limited in their finegrainedness.

Learning anatomical embeddings that are universal across body parts, without anatomical labels in training, is a challenging task. For example, in CT images, a method has to memorize the 3D contextual appearance of various body parts so as to generate globally distinguishable embeddings. Meanwhile, the method needs to encode local information to differentiate adjacent structures with similar appearance for accurate localization. In addition, the embeddings should be robust to the sizes, shapes, intensities, and texture diversity of body parts, which may be caused by inter-subject variation, organ deformation, contrast injection, and pathological changes.

BRIEF SUMMARY OF THE DISCLOSURE

One aspect or embodiment of the present disclosure provides a computer-implemented self-supervised anatomical embedding (SAM) method for medical images. The method includes randomly selecting a plurality of images from an unlabeled image batch; for each image of the plurality of images, performing random data augmentation to obtain a patch pair which is inputted to a neural network; generating global and local embedding tensors for each patch of the patch pair using the neural network; selecting positive pixel pairs from the patch pair and obtaining positive embedding pairs corresponding to the positive pixel pairs, the positive embedding pairs including global positive embedding pairs and local positive embedding pairs; for each positive pixel pair, computing global and local similarity maps using the global and local embedding tensors; finding global hard negative embeddings using the global similarity maps; selecting global random negative embeddings from a plurality of patch pairs; and pooling the global hard negative embeddings and the global random negative embeddings to obtain final global negative embeddings; and finding local hard negative embeddings using the global and local similarity maps, and randomly sampling final local negative embeddings from the local hard negative embeddings; and minimizing a final info noise contrastive estimation (InfoNCE) loss including global and local InfoNCE losses. The global InfoNCE loss is computed using the global positive embedding pairs and the final global negative embeddings, and the local InfoNCE loss is computed using the local positive embedding pairs and the final local negative embeddings.

Another aspect or embodiment of the present disclosure provides a device for self-supervised anatomical embedding (SAM). The device includes a memory, containing a computer program stored thereon; and a processor, coupled with the memory and configured, when the computer program being executed, to perform a method including: randomly selecting a plurality of images from an unlabeled image batch; for each image of the plurality of images, performing random data augmentation to obtain a patch pair which is inputted to a neural network; generating global and local embedding tensors for each patch of the patch pair using the neural network; selecting positive pixel pairs from the patch pair and obtaining positive embedding pairs corresponding to the positive pixel pairs, the positive embedding pairs including global positive embedding pairs and local positive embedding pairs; for each positive pixel pair, computing global and local similarity maps using the global and local embedding tensors; finding global hard negative embeddings using the global similarity maps; selecting global random negative embeddings from a plurality of patch pairs; and pooling the global hard negative embeddings and the global random negative embeddings to obtain final global negative embeddings; and finding local hard negative embeddings using the global and local similarity maps, and randomly sampling final local negative embeddings from the local hard negative embeddings; and minimizing a final info noise contrastive estimation (InfoNCE) loss including global and local InfoNCE losses. The global InfoNCE loss is computed using the global positive embedding pairs and the final global negative embeddings, and the local InfoNCE loss is computed using the local positive embedding pairs and the final local negative embeddings.

Another aspect or embodiment of the present disclosure provides a computer program product comprising a non-transitory computer-readable storage medium and program instructions stored therein, the program instructions being configured to be executable by a computer to cause the computer to implement operations comprising: randomly selecting a plurality of images from an unlabeled image batch; for each image of the plurality of images, performing random data augmentation to obtain a patch pair which is inputted to a neural network; generating global and local embedding tensors for each patch of the patch pair using the neural network; selecting positive pixel pairs from the patch pair and obtaining positive embedding pairs corresponding to the positive pixel pairs, the positive embedding pairs including global positive embedding pairs and local positive embedding pairs; for each positive pixel pair, computing global and local similarity maps using the global and local embedding tensors; finding global hard negative embeddings using the global similarity maps; selecting global random negative embeddings from a plurality of patch pairs; and pooling the global hard negative embeddings and the global random negative embeddings to obtain final global negative embeddings; and finding local hard negative embeddings using the global and local similarity maps, and randomly sampling final local negative embeddings from the local hard negative embeddings; and minimizing a final info noise contrastive estimation (InfoNCE) loss including global and local InfoNCE losses. The global InfoNCE loss is computed using the global positive embedding pairs and the final global negative embeddings, and the local InfoNCE loss is computed using the local positive embedding pairs and the final local negative embeddings.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
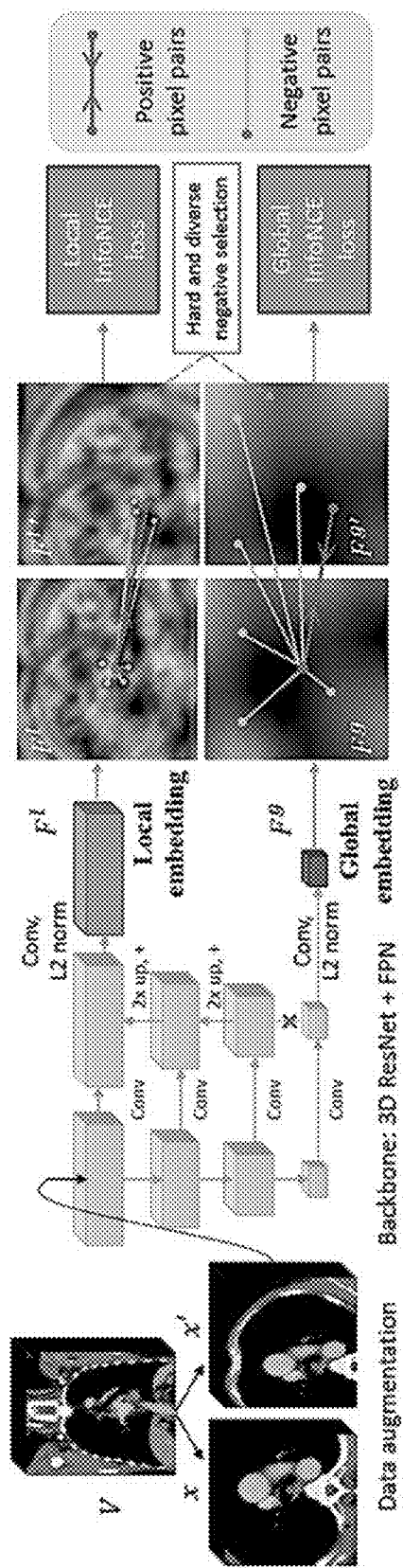
FIG. 1 illustrates an exemplary diagram of a self-supervised anatomical embedding (SAM) method according to various disclosed embodiments of the present disclosure.

Reference may be made in detail to exemplary embodiments of the disclosure, which are illustrated in the accompanying drawings. Wherever possible, the same reference numbers may be used throughout the drawings to refer to the same or like parts.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, such that an item or items following any one of these words is not meant to be an exhaustive listing of the item or items, or meant to be limited to only the listed item or items. And the singular forms "a," "an," and "the" are intended to include plural references, unless the context clearly dictates otherwise.

The present disclosure provides a self-supervised anatomical embedding (SAM) method. During a training process, data augmentation may be used to create synthetic body part pairs and simulate appearance changes across different images. To cover both global and local information, a coarse-to-fine architecture with two-level embeddings may be designed. The global embeddings may be trained to distinguish every body part on a coarse scale, helping the local embeddings to focus on smaller regions with finer features. The selection of negative samples (e.g., dissimilar body parts) is a crucial step of contrastive learning. Multiple strategies may be used to control the difficulty and diversity of the selected negative samples. Finally, during an inference process, the embeddings may be matched efficiently using 2D or 3D convolutional operations.

The major contributions of the SAM method may be three-fold as the following: 1) the problem of universal anatomical embedding learning is tackled for the first time, and discriminative and robust embeddings may be learned in a self-supervised manner; 2) the pixel-level contrastive learning framework is designed with the coarse-to-fine architecture and customized using negative sampling strategies, and the SAM method is easy to train and has a significantly short processing time; and 3) learned embeddings are used in various applications (e.g., landmark detection and lesion matching) on different image modalities (e.g., 3D CT and 2D X-ray) of varying body parts (e.g., chest, hand, pelvis, and the like), and similar or superior performance is achieved compared to existing registration or supervised methods.

In self-supervised learning (SSL), visual features may be learned from unlabeled data by optimizing a heuristic pretext task, such as predicting image rotations and inpainting. Contrastive learning may use image instance discrimination as the pretext task and has achieved promising performance. Some SSL methods may be developed to learn dense representations for semantic matching, object part segmentation, or network pretraining. In contrast, the present disclosure is not to pretrain networks, but to learn semantic anatomical embeddings that can be directly used in downstream tasks without finetuning, which may be realizing using the coarse-to-fine architecture and sample selection strategies. Anatomical landmark detection is important to initialize or aid medical imaging tasks. Heatmap and coordinate based methods may have been explored; and deep adaptive graphs may be adopted to capture relationships among landmarks and achieved useful results in three X-ray datasets. However, the above-mentioned methods may all need training labels and only predict the predefined anatomical positions, whereas the SAM method is unsupervised and uses embedding matching to find arbitrary landmarks of interests. Anatomy-specific classification or regression methods may predict predefined body part classes or scores of CT slices. Compared to their slice-wise coarse predictions, the pixel-wise embedding using the SAM method may be more fine-grained. Image registration is popularly used to find pixelwise correspondences in medical images. Existing methods may iteratively optimize a predefined objective function for an image pair, which is often accurate but time consuming. The main difference between registration and the SAM method is that registration requires an image pair as input and aims at aligning each pixel via fundamental appearance-based similarity measures, whereas the SAM method needs only one image and focuses on semantically representing each pixel.

Radiological images such as CT and X-rays may render anatomy with intrinsic structures. Being able to reliably locate the same anatomical or semantic structure across varying images is a fundamental task in medical image analysis. In principle, it is possible to use landmark detection or semantic segmentation for this task, but to work well these require large numbers of labeled data for each anatomical structure and sub-structure of interest. A more universal approach may be used to discover the intrinsic structure from unlabeled images. The SAM method may generate semantic embeddings for each image pixel that describes its anatomical location or body part. To produce such embeddings, the pixel-level contrastive learning framework may be designed. The coarse-to-fine strategy may ensure both global and local anatomical information are encoded. Negative sample selection strategies may be used to enhance the discriminability among different body parts. Using the SAM method, once any point of interest is labeled on the template image, the same body part in other images may be located by simple nearest neighbor searching.

Various embodiments of the present disclosure provide a method, a device, and a computer program product for self-supervised learning of pixel-wise anatomical embeddings in medical images. The SAM method is described in detail according to various embodiments of the present disclosure hereinafter.

FIG. 1 illustrates an exemplary diagram of a SAM method according to various disclosed embodiments of the present disclosure. Referring to FIG. 1, for the learning process of the SAM method, random data augmentation may first be performed on an unlabeled image to obtain a patch pair (i.e., two patches), then the two transformed patches may be sent to a network to generate a global embedding vector and a local embedding vector for each pixel. One embedding channel of an axial image slice may be visualized in the FIG. 1 with the global embedding zoomed in. Next, a global InfoNCE (info noise contrastive estimation) loss and a local InfoNCE loss may be used to encourage matched pixels (i.e., positive pairs) to have similar embeddings, while pushing unmatched pixels (i.e., negative samples) apart. Hard and diverse negatives (e.g., negative samples or pixels) may be selected for both global and local embeddings.

The objective of the SAM method in the present disclosure may be encoding the semantic anatomical information of each pixel, such that similar body parts in different images may have similar embeddings. The SAM method may be enabled to compare every part of the image to discover distinctive patterns by itself. The method may include the following steps: stochastic (i.e., random) data augmentation for training patch generation, coarse-to-fine CNN (convolutional neural network) for pixel-wise feature embedding, and positive and negative sample selection for contrastive loss computation. In various embodiments of the present disclosure, the SAM method for 3D images such as CT may be elaborated. It is straightforward to adapt the SAM method to 2D images such as X-ray by changing the network from 3D to 2D.

The coarse-to-fine network architecture may be described in various embodiments of the present disclosure. To learn universal anatomical embeddings, on the one hand, the SAM method needs to memorize 3D contextual appearances of various body parts, such that globally distinguishable embeddings may be generated; on the other hand, the SAM method needs to encode local information to differentiate adjacent structures with similar appearances for accurate localization. To achieve the above-mentioned both functions, the coarse-to-fine network architecture which predicts a global embedding and a local embedding for each pixel may be used. A lightweight 3D ResNet-18 may be adopted as backbone with a feature pyramid network (FPN) to fuse multi-scale features. The ResNet-18 may be initialized with ImageNet pretrained weights using an inflated 3D technique. The 4D global embedding tensor $F^g$ and the 4D local embedding tensor $F^l$ may both be generated from the FPN features using separate 3×3×3 convolutions and L2 normalization layers. $F^g$ is from the coarsest FPN level with larger strides and more abstract features, while $F^l$ is from the finest FPN level with smaller strides and detailed features. For example, the connection between the coarsest FPN feature and its upper level may be cut to make $F^g$ and $F^l$ more independent, referring to FIG. 1. Examples of the learned $F^g$ and $F^l$ may be found in FIG. 1, where $F^l$ contains more high-frequency details.

Sampling strategies and loss function may be described in various embodiments of the present disclosure. In every training batch, b unlabeled CT volumes may be randomly sampled. On each volume V, two 3D patches with random locations and sizes may be cropped and resized to the same shape, namely x, $x' \in \mathbb{R}^{d \times h \times w}$. When the two patches overlap, pixel pairs may be determined from the two patches such that each pair corresponds to a same position (e.g., body part) in the original volume. Since whole-body CT images are typically large (512×512 with hundreds of slices), randomly cropped patches may not always overlap. It is important to keep these non-overlapping patch pairs since such patch pairs can teach the model (e.g., the SAM method) to differentiate body parts with large distances (e.g., neck and pelvis). Other intensity and spatial transforms to the patches may also be performed according to various embodiments of the present disclosure.

Next, positive and negative samples (e.g., negative pixels) may be selected from the image patches. Compared with image-level contrastive learning, the pixel-level framework may have abundant samples in each training batch, such that all samples may be selected efficiently within each training batch. When the image patches x and x' overlap, $n_{pos}$ pixels $p_i \in x$ may be randomly sampled from the overlapping area, each with a corresponding pixel $p_i' \in x'$ to build a positive pair. The sampling position should avoid blank areas outside the body in CT. The positive embeddings at $p_i$, $p_i'$ are $f_i$, $f_i' \in \mathbb{R}^c$, $1 \leq i \leq n_{pos}$. When the image patches x and x' do not overlap, $n_{pos}$ pixels may be randomly sampled from each patch, and each embedding may be considered as being similar to itself. For each positive pair $(p_i, p_i')$, $n_{neg}$ pixels may also be found as negative samples (e.g., pixels) which are randomly sampled from x and x' as long as their distances from $p_i$ and $p_i'$ are larger than $\delta$ (for example, $\delta = 3$ mm), which may not be limited according to various embodiments of the present disclosure. If the embeddings at the negative pixels of a positive pair i are denoted as $h_{ij} \in \mathbb{R}^c$, $1 \leq j \leq n_{neg}$, the InfoNCE loss for such patch pair (x, x') is defined as:

$$L = -\sum_{i=1}^{n_{pos}} \log \frac{\exp(f_i \cdot f_i' / \tau)}{\exp(f_i \cdot f_i' / \tau) + \sum_{j=1}^{n_{neg}} \exp(f_i \cdot h_{ij} / \tau)} \quad (1)$$

where $\tau=0.5$ is a temperature parameter, "•" is the inner product operation, and $f_i$ is called as an anchor embedding. When x and x' do not overlap, $f_i'$ is replaced with $f_i$ in equation (1). Since equation (1) should be symmetric with $f_i$ and $f_i'$, another loss term with swapped $f_i$ and $f_{i'}$ may also be computed and added. Equation (1) may be applicable to both global and local embeddings.

In the SAM method of the present disclosure, the global embedding $F^g$ is responsible for differentiating all body parts on a coarse scale. To make it more discriminative, online hard negative selection may be performed to train the global embedding. For each global anchor embedding $f_i^g$, its cosine similarity map may be computed with the global embedding tensors $F^g$ and $F^{g'}$, thereby obtaining similarity maps $S^g$ and $S^{g'}$. Then, global hard negatives embeddings $h_{ij}^g$ may be selected to be the $n_{neg}$ embeddings (that do not belong to $f_i^g$ or $f_i^{g'}$) with the greatest similarity with $f_i^g$. Furthermore, the negative samples may be populated to contain more diverse body parts. For each $f_i^g$, additional $n_{rand}^g$ pixels may be randomly sampled from all patches across all volumes within the training batch. Because such pixels originate from different image volumes, it is very unlikely the sampled pixels are in the same semantic position as $f_i^g$.

For the local embeddings, the positive pixel pairs ($p_i$, $p_i'$) same as the global version, but with different negative samples, may be used. For each local anchor embedding $f_i^l$, its local similarity maps $S_i^l$ and $S_i^h$ may be first computed with $F^l$ and $F^{l'}$, then $S_i^g$ and $S_i^{g'}$ may be upsampled to be the same size as $S_i^l$, and finally the combined global and local similarity maps $S_i^g + S_i^l$ and $S_i^{g'} + S_i^h$ may be used to select hard negatives pixels for $f_i^l$. Examples of $S^l$ and up-sampled $S^g$ may be refer to FIGS. 2-3. When the global embedding converges, $S_i^g$ may be high only in the neighborhood area of $p_i$ and $p_i'$, such that hard negatives may be selected mostly in the local area. During an inference process, the peak of $S^g$ and $S^l$ may be used to find matched points (e.g., pixels), such that using $S^g + S^l$ for local hard negative selection may be consistent with the inference process. Meanwhile, because the local embedding tensor has a high resolution, the selected local hard negatives may mostly be correlated adjacent pixels. To improve diversity, the top $n_{cand}^l > n_{neg}$ hard negative candidates may be first determined, then $n_{neg}$ embeddings may be randomly sampled from the top hard negatives, which may be used in equation (1).

Figure 2:
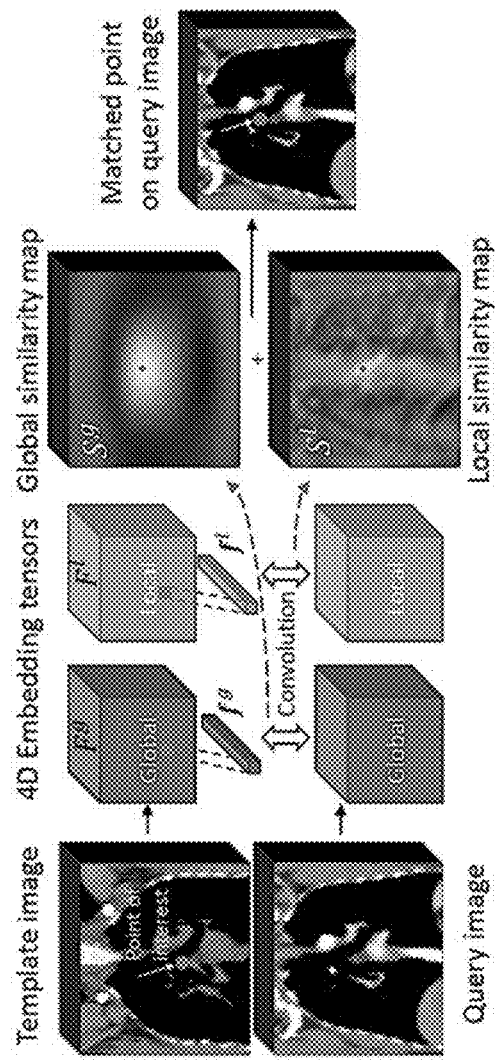
FIG. 2 illustrates an exemplary diagram of an inference process of a self-supervised anatomical embedding (SAM) method according to various disclosed embodiments of the present disclosure.
Figure 3:
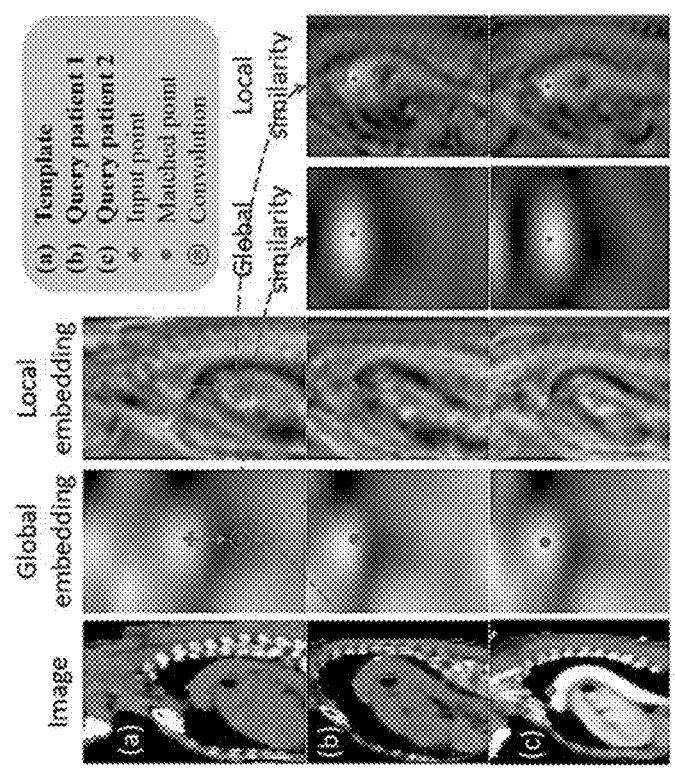
FIG. 3 illustrates exemplary anatomical location matching results of a self-supervised anatomical embedding (SAM) method according to various disclosed embodiments of the present disclosure.

FIG. 2 illustrates an exemplary diagram of an inference process of the SAM method according to various disclosed embodiments of the present disclosure. Referring to FIG. 2, to locate a certain point of interest, the point of interest may first need to be labeled on a template image (also known as an atlas or support image); then, given an unlabeled query image, the global and local embedding tensors may be computed, the anchor embedding vectors may be extracted from the point of interest of the template image, and the similarity maps $S^g$ and $S^l$ between the anchor embeddings tensors and the query embedding tensors. Since the embeddings are L2-normalized, the cosine similarity maps may be efficiently computed using the convolutional operation on GPU. Finally, $S^g$ and $S^l$ may be up-sampled to the size of the original image, and the peak of $S^g + S^l$ as the detected anatomical location may be determined.

Human organs are intrinsically structured, such that there is an inherent consistency underlying their appearance and layout in radiological images such as computed tomography and X-rays. In various embodiments of the present disclosure, the SAM method may be used to discover such intrinsic patterns by learning from unlabeled images. Given a certain anatomical location (e.g., the top of aortic arch) in one image, the trained SAM method may find the corresponding location in other images (referring to FIG. 3). The universal SAM method may learn from unlabeled radiological images to detect arbitrary points of interest. The SAM method may generate an embedding on each image pixel to encode its anatomical context information, such that the same body part in different images may express similar embeddings and may be retrieved by simple nearest neighbor searching.

In various embodiments of the present disclosure, the SAM method may be evaluated on the following diverse tasks: 3D landmark detection on chest CT, 2D landmark detection on hand and pelvic X-rays, and 3D universal lesion matching on CT.

In one embodiment of the present disclosure, for the above-mentioned CT-based tasks, an unified SAM method may be first trained using the combination of three CT datasets, including a DeepLesion dataset, a NIH-Lymph Node database (NIH-LN), and an in-house chest CT dataset (ChestCT). DeepLesion is a large CT dataset with 20K sub-volumes covering the whole body, and contains a variety of contrast phases, reconstruction protocols, and pathology. The NIH-LN database includes 176 chest-abdomen-pelvis CT scans. The ChestCT database contains 94 patients, each with a contrast-enhanced (CE) and a non-contrast (NC) scan that are pre-aligned. When training the SAM method, no labels from the above-mentioned three datasets may be used. The official data split for the DeepLesion dataset may be followed, while all images in the NIH-LN database may be used for training. The patients in the ChestCT database may be randomly split to 65 for training, 11 for validation, and 18 for testing.

In one embodiment of the present disclosure, 3D landmark detection may be tested using ChestCT, which contains manual annotations of about 35 organs for each patient. About 19 landmarks, such as the top of the left lung, the bifurcation of the trachea, and the like, may be calculated to evaluate the SAM method. To detect landmarks in the one-shot setting, it may need to select a template image from the training set. The sample whose landmarks are closest to the average normalized landmarks may be chosen as the template. The template selection and landmarks may not be limited according to various embodiments of the present disclosure.

In one embodiment of the present disclosure, 2D landmark detection may be conducted on X-rays following existing settings. The hand and pelvic models may be trained separately. The hand X-ray dataset contains about 378 images for training and about 93 for testing. Images may be taken in different hand poses with resolutions in about 1500×2000; and about 30 landmarks may be manually labeled in each image. The pelvic X-rays may be taken of each patient's pelvic bone with resolutions of about 2500× 2000; and about 800 images may be used for training and about 200 images for testing. The template images may be chosen in the same manner as in ChestCT. In both hand and pelvic X-rays, there are high structural and appearance variations, caused by various pathologies (e.g., arthritis, bone fractures and metal prosthesis).

In one embodiment of the present disclosure, 3D Lesion matching may be tested using the DeepLesion dataset, which includes about 32K lesions annotated on about 4K patients. Most patients may have a plurality of follow-up CTs. Given a lesion annotation on one CT, the task of lesion matching may be to locate the corresponding lesion on another CT of the same patient. About 1,014 lesion pairs may be manually annotated on the validation and test sets of the DeepLesion dataset. The 3D bounding-box of each lesion may be generated; then, an embedding may be extracted from the center of the box of the template lesion and used to detect a matched point in the follow-up scan.

In one embodiment of the present disclosure, mean radial errors (MRE) and maximum radial errors may be used as the evaluation metrics. Radial errors are the Euclidean distances of predicted and ground-truth coordinates. For lesion matching, the central points of the lesions' 3D bounding-boxes are used as landmarks to compute errors. Besides, if a matched point falls in the lesion's bounding-box, such matched point is regarded as a correct match to calculate the accuracy.

In one embodiment of the present disclosure, the SAM method may be implemented in PyTorch with data augmentation libraries. The SAM method may be trained using rectified Adam (RAdam) with a learning rate of about 0.0001 and be converged in about 25K iterations. The batch size b may be about 8 for CT and about 16 for X-ray. The CT images may be normalized to a spacing of about 2×2×2 mm³, whereas the X-ray images may be resized to about 512×512. The patch size may be about 32×96×96 for CT and about 400×400 for X-ray. The backbone network may be 3D ResNet-18 for CT and 2D ResNet-34 for X-ray. Further increasing the network depth may not result in significant improvements. To enlarge the resolution of the feature maps, the strides in x, y axes may be changed to 1 in the conv1 block and the z stride may be changed to 1 in conv1, conv3, and conv4. The strides of the global and local embeddings for CT may be about 4×16×16 and about 2×2×2, respectively. The strides of the global and local embeddings for X-ray may be about 16×16 and about 2×2. The global and local embedding dimensions may both be c=128. The default sampling hyper-parameters for CT may be, for example, $n_{pos}=100$, $n_{neg}=500$, $n_{rand}^g=1000$, and $n_{cand}^l=2\times10^4$, which may not be limited according to various embodiments of the present disclosure. For X-ray, all sampling hyper-parameters may be same except for $n_{cand}^l=5000$, such that the local embedding may be more locally focused in 2D images.

Figure 4:
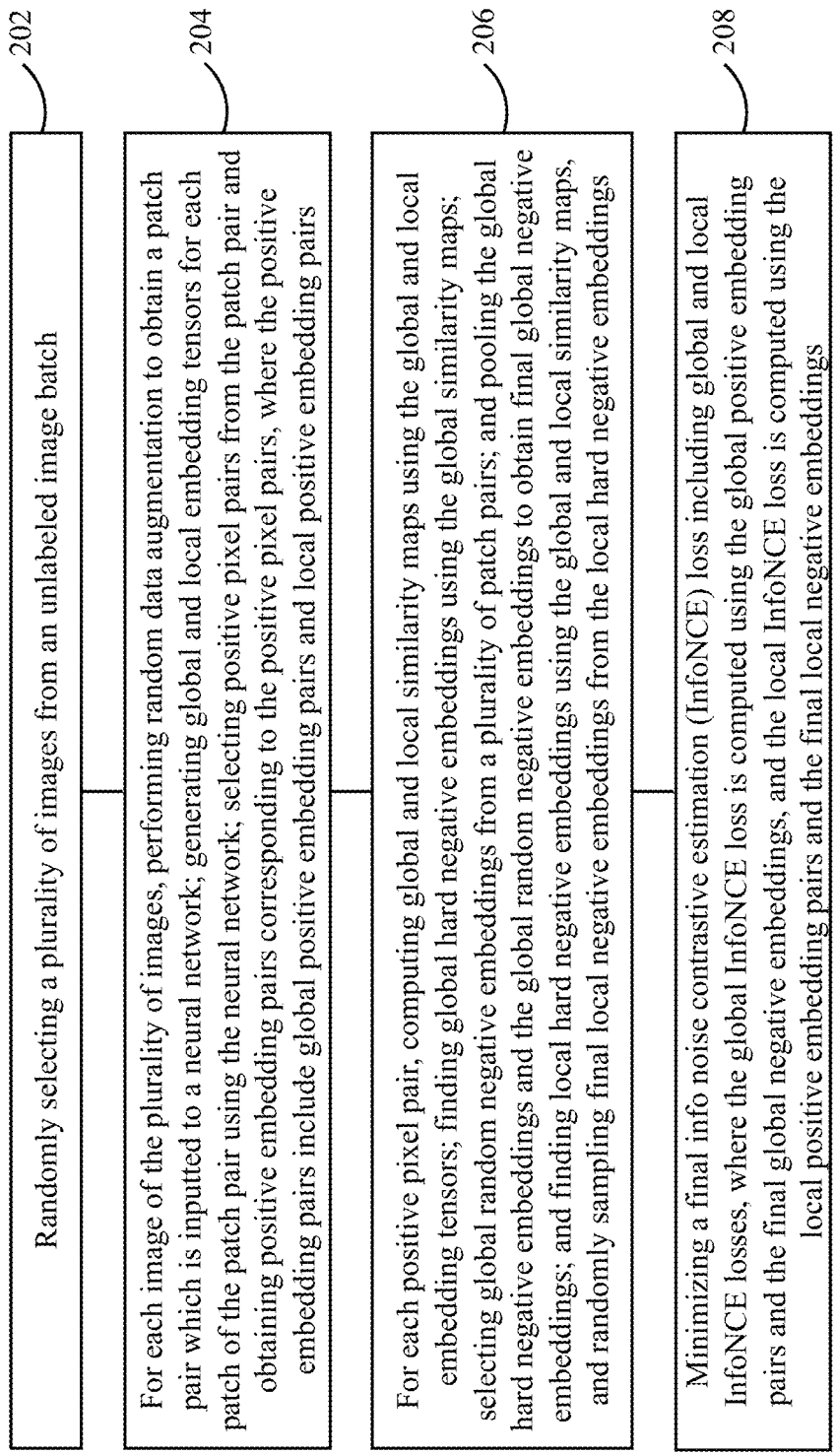
FIG. 4 illustrates a flow chart illustrating an exemplary training process of a self-supervised anatomical embedding (SAM) method according to various disclosed embodiments of the present disclosure.

FIG. 4 illustrates a flow chart illustrating an exemplary training process of the SAM method according to various disclosed embodiments of the present disclosure.

At S202, a plurality of images may be randomly selected from unlabeled images {V}.

At S204, for each image of the plurality of images, random data augmentation may be performed to obtain a patch pair (x, x'); global and local embedding tensors of the two patches $F^g$, $F^{g'}$, $F^l$ and $F^{l'}$ may be generated; positive pixel pairs ($p_i, p_i'$) may be sampled (e.g., selected); then positive embeddings pairs including global positive embedding pairs ($f_i^g, f_i^{g'}$) and local positive embedding pairs ($f_i^l, f_i^{l'}$) may be extracted (e.g., obtained), where $1 \leq i \leq n_{pos}$.

At S206, for each positive pair i, similarity maps including global similarity maps $S_i^g$, $S_i^{g'}$ and local similarity maps $S_i^l$, $S_i^{l'}$ may be computed; global hard negative embeddings $h_{ij}^g$ where $1 \leq j \leq n_{neg}$ may be found using the global similarity maps; global random negative embeddings $h_{ik}^g$, where $1 \leq k \leq n_{rand}^g$, may be sampled from a plurality of patch pairs in the training batch; the global hard negative embeddings and global random negative embeddings may be pooled to get final global negative embeddings; local hard negative embeddings $h_{ik}^l$, where $1 \leq k \leq n_{cand}^{gl}$, may be found using the global and local similarity maps; and $n_{neg}$ embeddings may be randomly sampled from the local hard negative embeddings as final local negative embeddings.

At S208, a final InfoNCE loss including global and local InfoNCE losses may be minimized, where the global and local InfoNCE losses $L^g$ and $L^l$ in equation (1) may be computed, and the final loss may be calculated as $L=L^g+L^l$.

Figure 5:
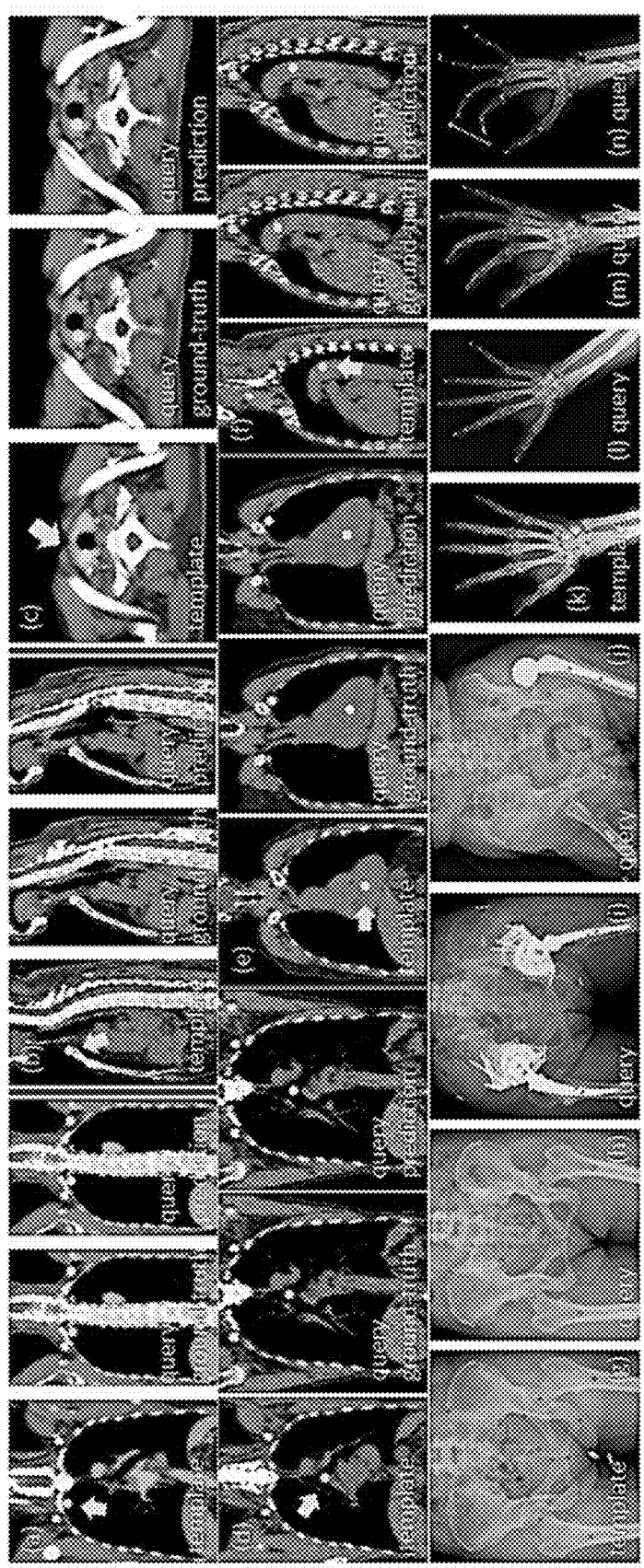
FIG. 5 illustrates exemplary landmark detection results of a self-supervised anatomical embedding (SAM) method according to various disclosed embodiments of the present disclosure.

FIG. 5 illustrates exemplary landmark detection results of the SAM method according to various disclosed embodiments of the present disclosure. Each image type (chest CT, pelvic X-ray, and hand X-ray) has only one template image. For CT images (a-f), the views (axial, coronal, sagittal) are selected in order to clearly show the point. For X-ray images (g-n), the white lines show the correspondence between ground-truth points and predicted points. (f), (j) and (n) are failure cases in which the prediction errors are larger. Referring to FIG. 5, the SAM method may accurately detect various landmarks in different body parts with only one template image. For example, in (e), the center of the heart in a texture-less non-contrast CT may be precisely located. In (f), the detection of the top of the descending aorta may be off in the z-axis, which is because the appearance difference between the true and predicted points in the z-axis is not discriminative enough, while the image context in the x, y-plane has inter-subject variability for such landmark. For X-ray images, the SAM method may locate the landmarks in the presence of body rotation, deformation, metal prostheses, and the like. Failure cases may occur when there are severe pathological deformations which significantly differ from the template image.

Figure 6:
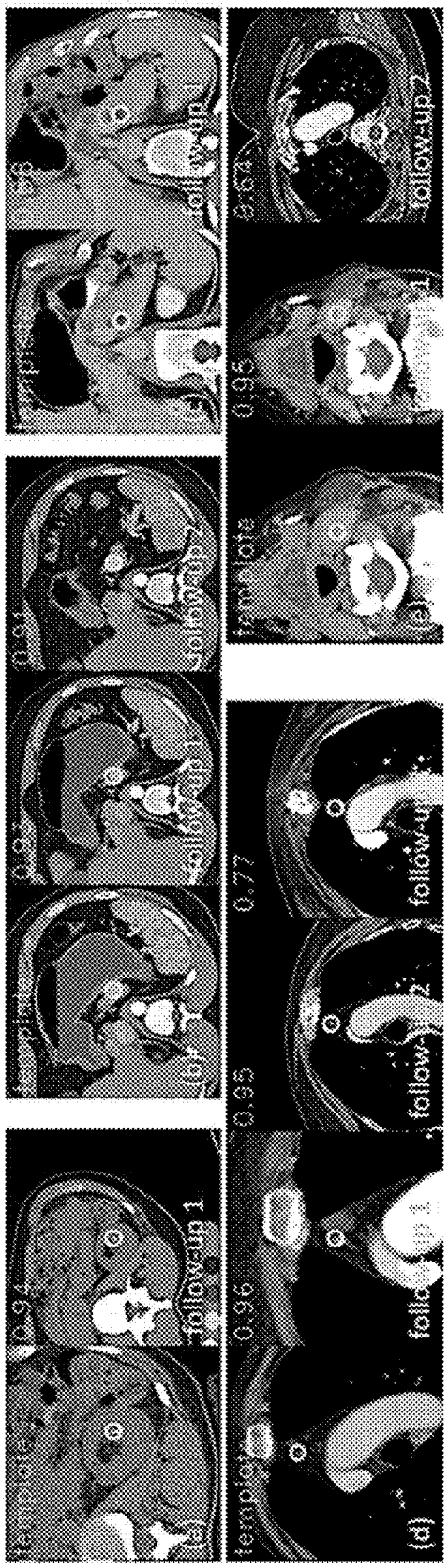
FIG. 6 illustrates exemplary lesion matching results of a self-supervised anatomical embedding (SAM) method according to various disclosed embodiments of the present disclosure.

FIG. 6 illustrates exemplary lesion matching results of the SAM method on DeepLesion according to various disclosed embodiments of the present disclosure. White circles mark the lesion's central point in the template scan and the detected points in follow-up scans; and the predicted similarity scores are also shown in FIG. 6. The dashed circle in follow-up 1 of (c) is another adjacent lesion; and follow-up 2 of (e) is from a CT volume that does not include the neck region. Referring to FIG. 6, the SAM method may match a variety of lesions effectively in follow-up CTs. For example, in (a), a tiny lesion may be located despite the image noise in the template image. In (b), the SAM method may be used to detect the lesion in follow-up 2 although it has a different context than the template image (notice the stomach). In (c), the SAM method may successfully differentiate the true matched lesion from an adjacent lesion. (d) is an interesting case where the lesion disappeared in follow-up 3 possibly due to surgery. The SAM method may locate the correct position even if the lesion no longer exists, showing that the method has learned the body part from the anatomical context. Besides, the follow-up 1 in (d) is a CT scan with a limited field of view, which is effectively handled by the SAM method. In some cases, a lesion in the template scan may not exist in the follow-up scan due to the scanning range differences in z-axis, which is the case in follow-up 2 of (e). The SAM method may detect an unrelated point with a low similarity score, which may be filtered with a score threshold when used in practical applications.

Figure 7:
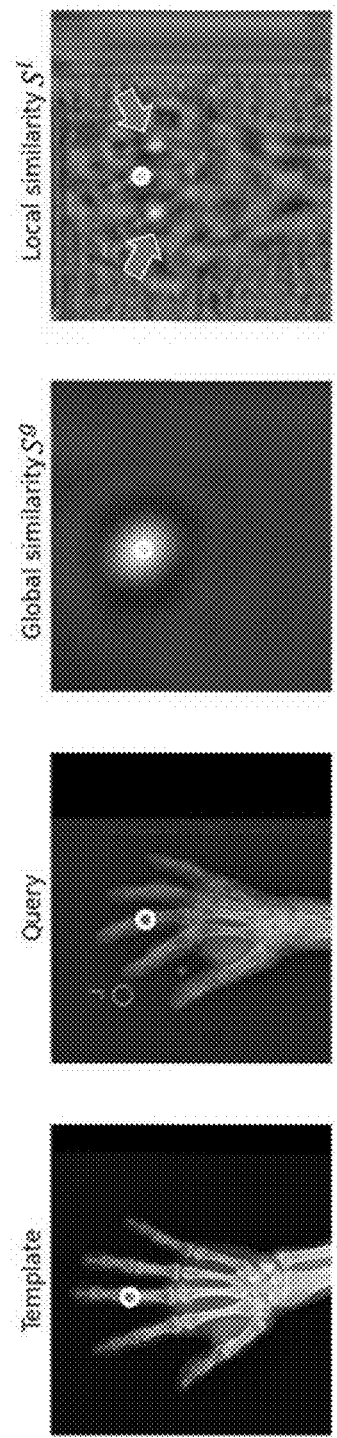
FIG. 7 illustrates exemplary landmark detection results of a self-supervised anatomical embedding (SAM) method according to various disclosed embodiments of the present disclosure.

Ablation and parameter study may be performed in various embodiments of the present disclosure. For the coarse-to-fine embedding architecture, referring to Table 1, Table 1 exhibits quantitative results of landmark detection and lesion matching on the four datasets, where the SAM method's accuracy may be high in all tasks. The coarse-to-fine embedding learning architecture is essential to the SAM method. Only learning one embedding for each pixel by removing the global embedding may be tested. As shown in row (b), the performance (e.g., MRE and Max results) may decrease considerably in various tasks, indicating that single scale embeddings struggle to encode both global and local anatomical information. Furthermore, both global and local embeddings may also be trained but only one of global and local embeddings may be used for inference, where the results are not promising as shown in rows (c) and (d). The global embedding may provide a rough localization but may not be significantly accurate. The local embedding may be located more precisely but also highlight distant areas with similar local textures if the global similarity is not considered, leading to a large maximum error. The local embedding may be further demonstrated in FIG. 7. An example in the hand X-ray dataset is illustrated in FIG. 7, where white circles show the ground-truth landmarks and arrows indicate spurious highlights in the local similarity map of the query image.

For sampling strategies, applying hard and diverse negative sampling may improve performance. The diverse negative indicates the $n_{rand}^g$ random negatives in global embeddings and the $n_{neg}$ random negatives sampled from $n_{cand}^l$ hard negatives in local embeddings. For example, in row (h) of Table 1, if only hard negatives are sampled in local embedding learning, the maximum error may increase which may be because the model overfit to the hard examples in the training set; therefore more distant false highlights may be produced in the test set. In row (i) of Table 1, the SAM method may be trained on the NIH-LN dataset and tested on DeepLesion and ChestCT datasets. The method performance may degrade slightly compared to row (a) of Table 1 where DeepLesion and ChestCT datasets are used in training, showing that the learned anatomical embeddings of the SAM method may be generalizable across datasets.

dings in CT, while random deformation and rotation (within 30°) may be crucial for hand X-ray, as rotated and deformed hands are common in the dataset. Random flipping may harm performance as the medical images used are normalized in corresponding coordinate space. The data augmentation approach for learning effective anatomical embedding may be essential only if the corresponding image variance commonly exists in the datasets.

TABLE 2

MRE with different data augmentation used in training

| Method | ChestCT CE | ChestCT NC | Hand X-ray | Pelvic X-ray | Lesion match |
|---|---|---|---|---|---|
| Crop only | 4.7 | 4.7 | 26.7 | 32.6 | 2.8 |
| + Scaling | 4.3 | 4.6 | 21.9 | 32.9 | 2.7 |
| + Intensity jitter | 4.3 | 4.5 | 22.6 | 33.8 | 2.7 |
| + Deformation & Rotation | 4.5 | 4.6 | 13.1 | 32.2 | 2.6 |
| + Flip | 4.6 | 5.0 | 64.9 | 326.4 | 2.8 |

Figure 8:
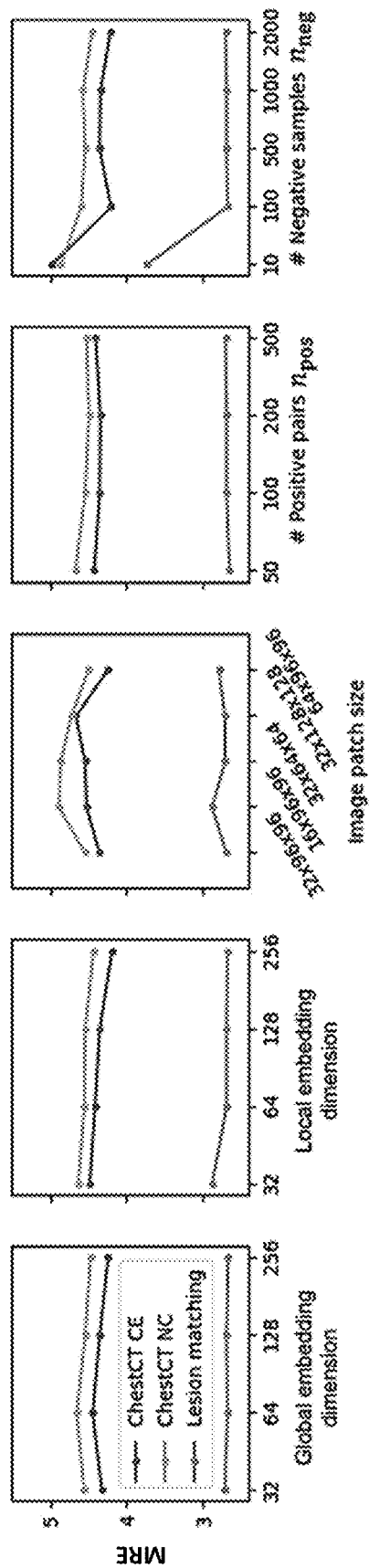
FIG. 8 illustrates an exemplary parameter study of a self-supervised anatomical embedding (SAM) method according to various disclosed embodiments of the present disclosure.

For parameter study, referring to FIG. 8, FIG. 8 illustrates an exemplary parameter study of the SAM method according to various disclosed embodiments of the present disclosure. The influence of parameter values may be shown in FIG. 8. The SAM method may be robust to embedding dimensions, although larger dimensions may slightly improve performance. The size of the image patch in z-axis may not be significantly small, for example should be equal to or greater than 32 pixels. The SAM method may be robust to $n_{pos}$ and $n_{neg}$ pixels (e.g., samples) as long as $n_{neg} \geq 100$.

For the 3D landmark detection task, four widely used existing registration methods in one-shot (e.g., single atlas) setting may be compared according to various embodiments of the present disclosure. The template CT image in the training set may be registered respectively to the images in the test set. The landmark detection errors are shown in Table 3. The SAM method may outperform the registration methods, including the Affine, free-form deformation (FFD), symmetric normalization (SyN) and DEEDs, using both

TABLE 1

Ablation study of the SAM method

| Method | ChestCT CE MRE | Max | ChestCT NC MRE | Max | Hand X-ray MRE | Pelvic X-ray MRE | Universal lesion matching Accuracy | MRE | Max |
|---|---|---|---|---|---|---|---|---|---|
| (a) SAM | 4.3 ± 3.0 | 16.4 | 4.5 ± 3.0 | 18.5 | 13.1 ± 32.3 | 32.2 ± 26.2 | 91.1 | 2.7 ± 2.5 | 28.8 |
| (b) w/o coarse-to-fine structure | 4.9 ± 3.0 | 17.4 | 5.2 ± 4.3 | 61.2 | 26.1 ± 70.0 | 34.4 ± 31.6 | 84.1 | 3.5 ± 3.1 | 41.1 |
| (c) Test: global embedding only | 9.9 ± 12.1 | 80.1 | 9.4 ± 10.4 | 79.3 | 437.0 ± 431.1 | 48.8 ± 28.8 | 52.5 | 6.6 ± 3.2 | 29.9 |
| (d) Test: local embedding only | 6.3 ± 12.2 | 150.1 | 6.5 ± 9.2 | 84.7 | 473.4 ± 519.2 | 34.6 ± 43.3 | 90.1 | 3.2 ± 6.6 | 130.4 |
| (e) w/o hard negative in global | 4.3 ± 3.1 | 20.8 | 4.6 ± 3.1 | 20.8 | 17.9 ± 55.0 | 32.7 ± 25.8 | 90.7 | 2.7 ± 2.6 | 31.6 |
| (f) w/o diverse negative in global | 4.4 ± 3.0 | 16.4 | 4.8 ± 5.2 | 85.0 | 14.4 ± 38.2 | 32.0 ± 25.2 | 90.0 | 2.8 ± 2.6 | 28.8 |
| (g) w/o hard negative in local | 4.6 ± 3.4 | 18.1 | 4.7 ± 3.3 | 18.7 | 17.4 ± 31.5 | 41.4 ± 30.8 | 89.0 | 3.0 ± 2.7 | 27.9 |
| (h) w/o diverse negative in local | 4.7 ± 5.8 | 94.0 | 5.3 ± 7.0 | 94.2 | 16.6 ± 47.2 | 43.7 ± 40.5 | 92.7 | 2.5 ± 2.6 | 28.8 |
| (i) SAM trained on NIH-LN alone | 4.5 ± 3.3 | 20.8 | 4.9 ± 3.7 | 24.2 | — | — | 91.4 | 2.7 ± 2.6 | 30.7 |

For data augmentation, referring to Table 2, Table 2 analyzes the effect of different data augmentation approaches, which is key to contrastive learning. Random cropping and scaling may suffice to learn desirable embedcontrast-enhanced (CE) and non-contrast (NC) CT, while the SAM method may only take about 0.23 second to process one volume. Deformable registration methods may require a robust initial alignment to perform desirably and may struggle when the two images exhibit large differences in terms of body sizes or poses, organ shapes and respiratory statuses. In contrast, the SAM method may be able to encode semantic and fine-grained anatomical information, which may address the landmark matching problem effectively from another direction. For example, the MRE (mean radial error) for the SAM method is about 4.5 for NC CT and about 4.3 for CE CT, while the MRE for the DEEDs method is about 4.7 for NC CT and about 4.6 for CE CT. The MREs for the SAM method using different phases to train and test (e.g., 4.5 for CE-to-NC and 4.8 for NC-to-CE) may be comparable to using the same modality to train and test (e.g., 4.5 for NC-to-NC and 4.3 for CE-to-CE, respectively), showing the SAM method's robustness to contrast changes in CT.

TABLE 3

Method comparison on the ChestCT dataset

| | CE MRE | CE Max | NC MRE | NC Max | Time (s) |
|---|---|---|---|---|---|
| Affine | 8.4 ± 5.2 | 32.9 | 8.5 ± 5.3 | 33.1 | 6.82 |
| FFD | 5.4 ± 4.1 | 29.1 | 5.5 ± 3.9 | 24.6 | 86.66 |
| SyN | 5.1 ± 3.7 | 21.9 | 5.3 ± 3.7 | 22.9 | 78.58 |
| DEEDs | 4.6 ± 3.3 | 18.8 | 4.7 ± 3.3 | 18.9 | 50.16 |
| SAM | 4.3 ± 3.0 | 16.4 | 4.5 ± 3.0 | 18.5 | 0.23 |

For the 2D X-ray landmark detection task, the SAM method may be compared with a strong supervised baseline HRNet and deep adaptive graph (DAG), which are retrained in a few-shot setting. Referring to Table 4, the SAM method may outperform HRNet trained on 50 samples, and DAG trained on 5 samples, which shows the efficacy of the SAM method since only one labeled template is used. Supervised methods may be dedicated to modeling specific landmarks, so that such methods may take advantage of labeled samples better than self-supervised methods. However, supervised methods may only detect what has been a priori labelled, while the SAM method may detect arbitrary anatomical locations.

TABLE 4

Method comparison on the X-ray datasets

| Method | # Labeled samples | Pelvic X-ray | Hand X-ray |
|---|---|---|---|
| HR-Net | 5 | 139.1 ± 327.5 | 43.3 ± 112.0 |
| | 50 | 35.1 ± 78.1 | 14.1 ± 14.7 |
| DAG | 5 | 35.3 ± 53.2 | 16.4 ± 39.5 |
| | 50 | 21.5 ± 19.84 | 6.2 ± 4.2 |
| SAM | 1 | 32.2 ± 26.2 | 13.1 ± 32.2 |

For the lesion matching task, the SAM method may be compared with two supervised lesion embedding methods trained on manual labels or labels mined from radiological reports. Since the supervised lesion embedding methods need the bounding-box of the lesion as input, a lesion detector VULD may be used to first detect all lesion candidates in the query CT, and then the lesion candidates may be matched with the template lesion. For example, the supervised lesion embedding methods have accuracies of 80.7% for lesion embedding and 82.1% for LesaNet, both significantly lower than 91.1% for the SAM method. The bottleneck of supervised detection matching methods may be detection because it is difficult to find all lesion candidates especially when the candidates are small and subtle (e.g., (d) in FIG. 5). Therefore, the direct matching strategy in the present disclosure may be more suitable by avoiding the intermediate detection step.

Figure 9:
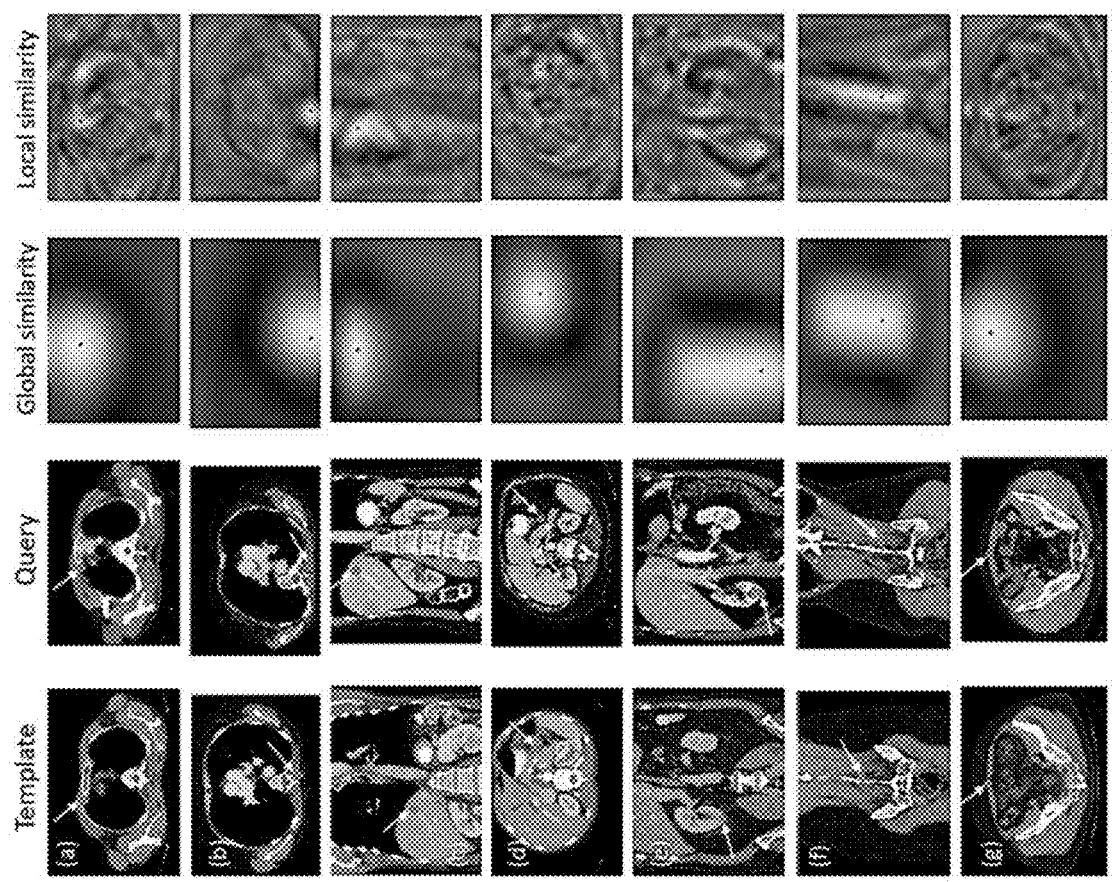
FIG. 9 illustrates exemplary random anatomical point matching results of a self-supervised anatomical embedding (SAM) method according to various disclosed embodiments of the present disclosure.

For universal anatomical point matching in CT in the present disclosure, to demonstrate that the SAM method can be used to detect arbitrary anatomical locations, a point in a template CT image may be randomly selected, and then the SAM method may be used to find its matched point in a query image from another patient. FIG. 9 illustrates exemplary random anatomical point matching results of the SAM method according to various disclosed embodiments of the present disclosure. Referring to FIG. 9, the template image, query image, global similarity map, and local similarity map are displayed in each row; the points, which are indicated by arrows, are selected points in template images or detected points in query images and similarity maps; and the views (axial, coronal, sagittal) in each row are selected in order to clearly show the corresponding point. The SAM method may accurately find the matched anatomical location in the query image despite significant inter-subject variability, organ deformation, contrast changes, and the like.

Figure 10:
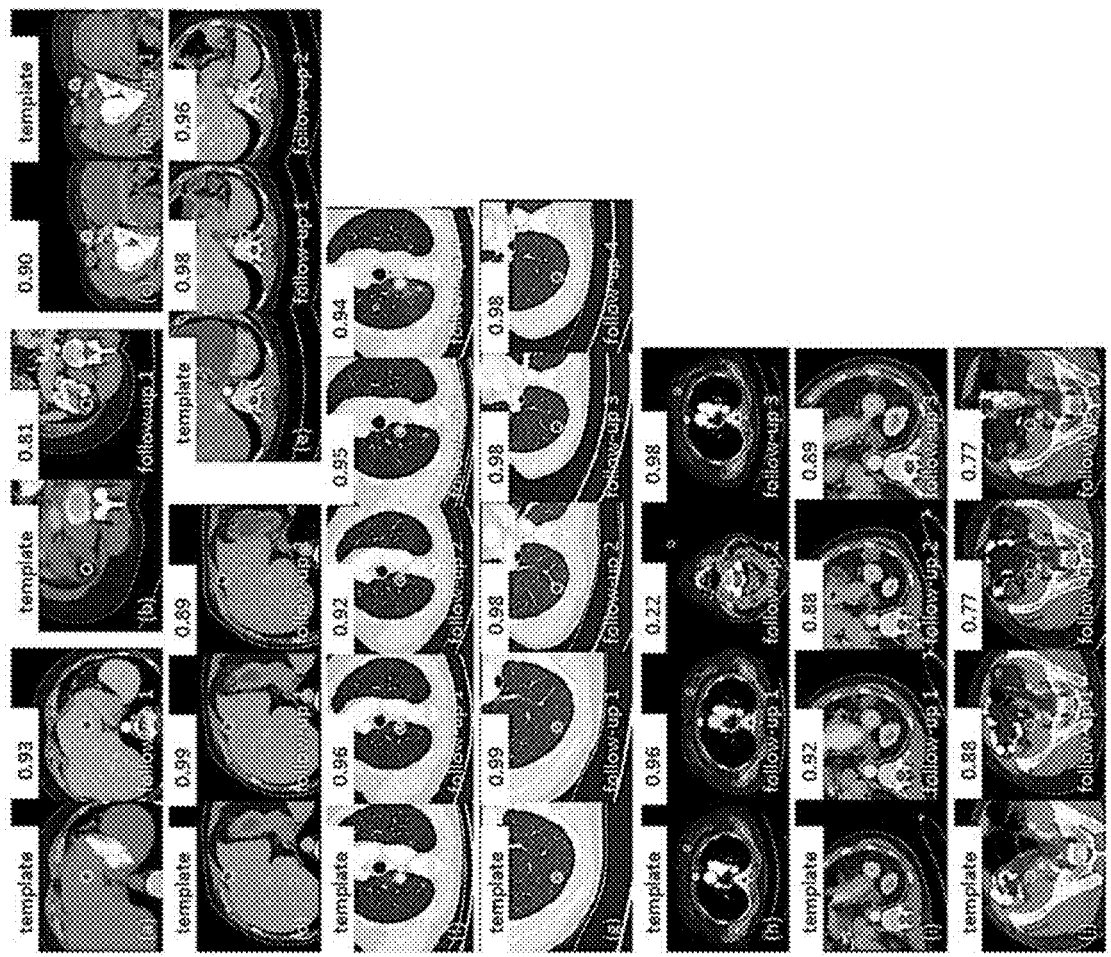
FIG. 10 illustrates exemplary universal lesion matching results of a self-supervised anatomical embedding (SAM) method according to various disclosed embodiments of the present disclosure.

For universal lesion matching in the DeepLesion dataset in the present disclosure, referring to FIG. 10, FIG. 10 illustrates exemplary universal lesion matching results of the SAM method according to various disclosed embodiments of the present disclosure. As shown in FIG. 10, the circles mark the lesion's central point in the template scan and the detected points in follow-up scans; and the predicted similarity scores are also shown in FIG. 10. (c) in FIG. 10 may show an example of using a lesion annotation from a follow-up scan as template to match lesions in earlier scans, which may help radiologists to determine if the lesion has been missed in earlier scans. Follow-up 2 of (h) may be from a CT volume which does not include the chest region, so that the SAM method may match an unrelated point with a low score. In various embodiments of the present disclosure, the SAM method may successfully match a variety of lesions in different body parts on the follow-up scans.

For template selection for landmark detection in the present disclosure, to detect landmarks in the one-shot setting, a template image may be selected from the training set. The image whose landmarks are closest to the average normalized landmarks may be chosen as the template, which is similar to the atlas selection approach in one-shot segmentation.

Figure 11:
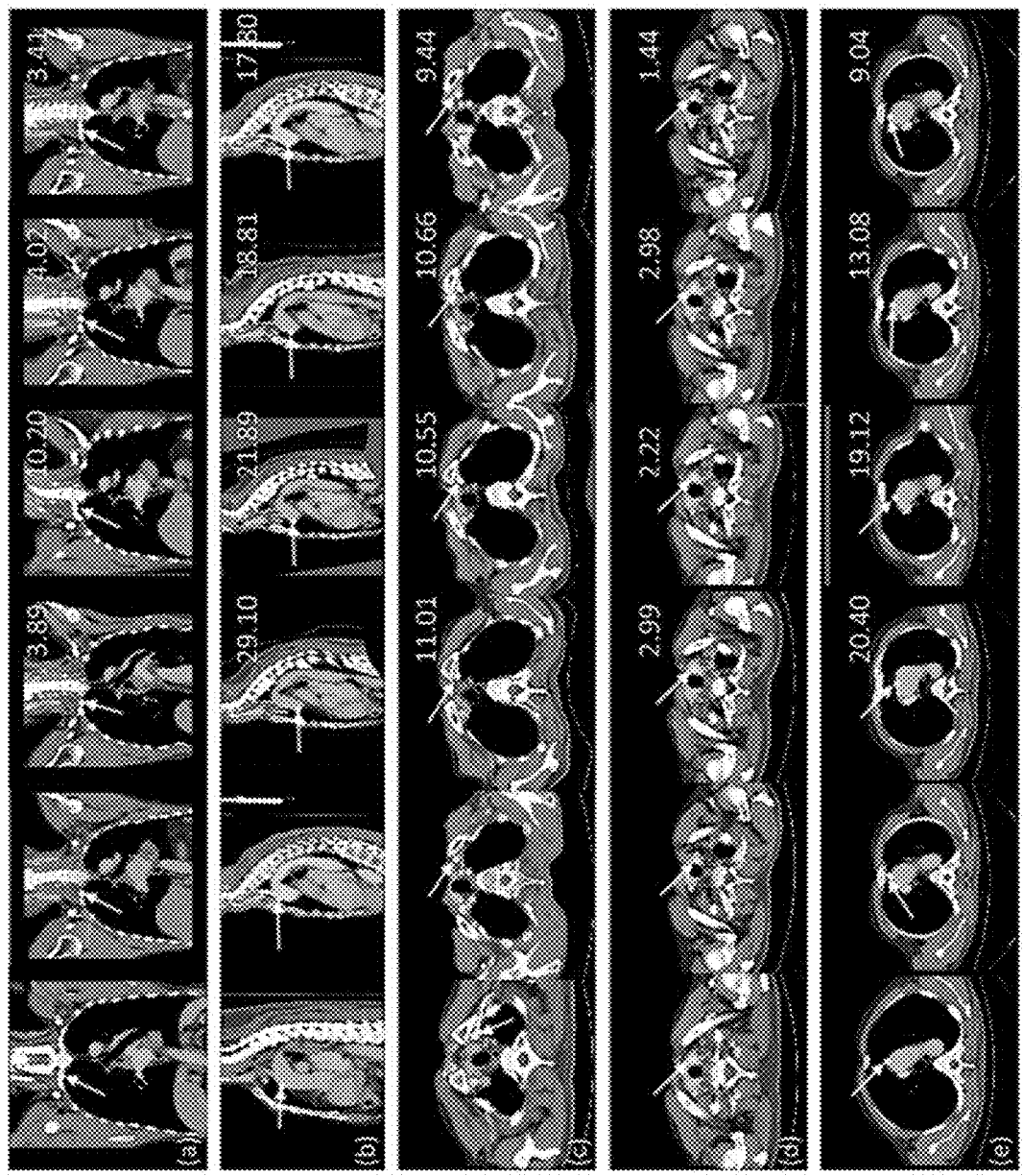
FIG. 11 illustrates exemplary three-dimensional landmark detection results of a self-supervised anatomical embedding (SAM) method according to various disclosed embodiments of the present disclosure.
Figure 12:
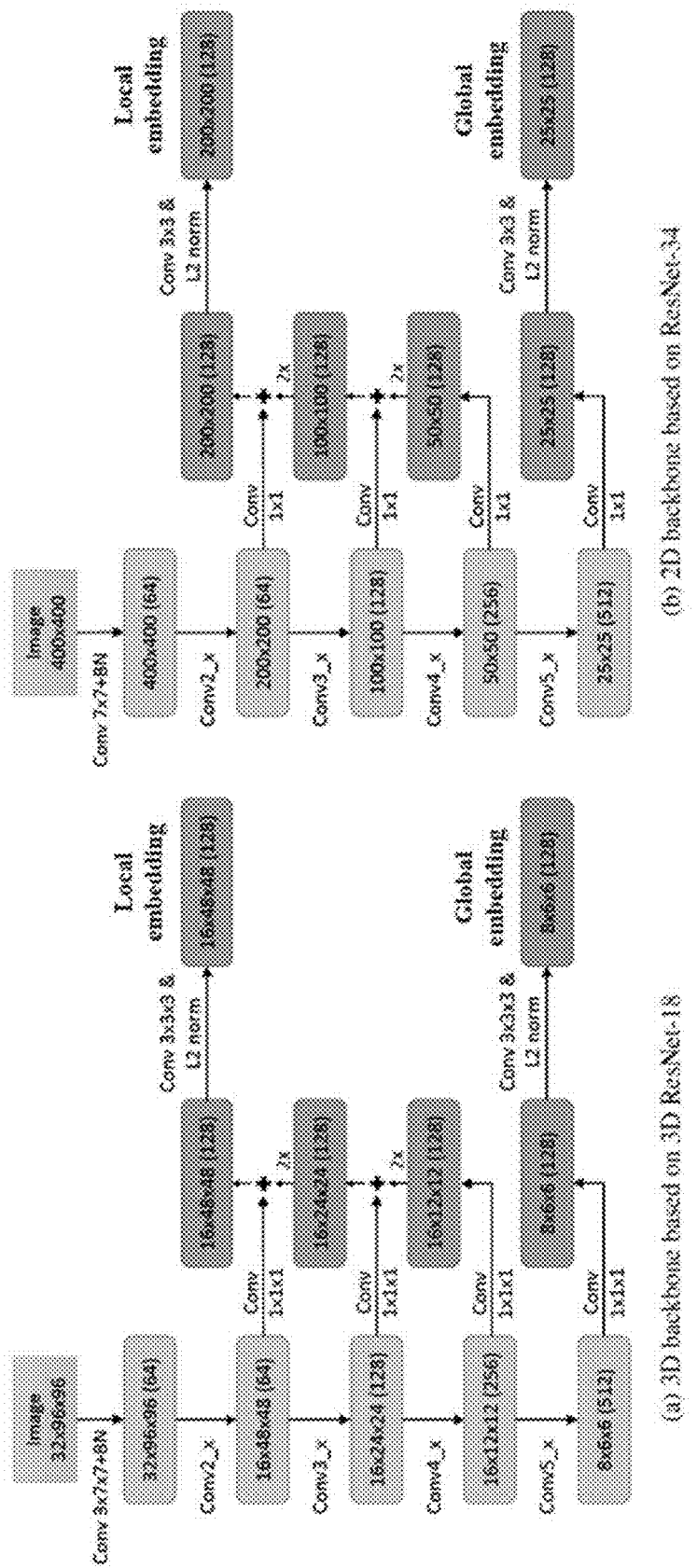
FIG. 12 illustrates exemplary coarse-to-fine architectures for three-dimensional and two-dimensional images according to various disclosed embodiments of the present disclosure.

For landmark computation and detection on ChestCT in the present disclosure, the ChestCT dataset may contain manually annotated masks of about 35 organs for each patient, and the organ masks may be used to compute about 19 landmarks. Taking "top of aortic arch" as an example, the most superior axial slice that contains the mask of "aortic arch" may be first found, and then its center of mass as the landmark may be calculated. Such 19 landmarks may include trachea bifurcation, bottom of right and left internal jugular vein, bottom of ascending aorta, top of descending aorta, top/anterior of aorta arch, 3D center of aorta arch, 3D center of heart, left end of left bronchus, left and top of pulmonary artery, 3D center of pulmonary artery, top of left and right lung, 3D center of left and right thyroid, top of sternum, and top of superior vena cava vein. The 3D landmark detection comparison between the SAM method and four widely-used existing registration methods are illustrated in FIG. 11. FIG. 11 illustrates exemplary three-dimensional landmark detection results of the SAM method according to various disclosed embodiments of the present disclosure. The mean radial error of each method and the points of interest which are indicated by arrows are also shown in FIG. 11. Columns 3 to 5 present registered/ deformed template images according to the query one using FFD, SyN, and DEEDs, respectively. Larger appearance inconsistency between the registered image and the query one typically may indicate larger landmark detection errors. (a) in FIG. 11 may show an example for detecting the top of right lung, where lungs in the template image are larger than those in the query one. Although most methods performed well to detect the lung top, registration based methods may present obvious deformation errors near the lung bottom, especially for FFD and SyN. (b) and (c) in FIG. 11 may show examples of detecting the anterior of aorta arch and bottom of internal jugular vein. The query images may be different from the template in body pose (b) and shape (c), and registration based methods may exhibit large deformation error near aorta arc (b) and anterior of chest wall (c). (d) in FIG. 11 may present a case that the template and query images have different thyroid sizes, where the SAM method is able to provide more accurate localization. (e) in FIG. 11 may show an example where the registration based methods could not perform well due to the large difference between the template image and the query image, while the SAM method directly matches the landmark with higher accuracy. From various embodiments of the present disclosure, it can be noted that existing registration methods may struggle when the two images exhibit large differences in terms of body sizes/poses, organ shapes and respiratory statuses, while the SAM method may detect the landmarks more accurately with self-supervised appearance embeddings. The detailed 3D and 2D network architectures of the SAM method are illustrated in FIG. 12.

In various embodiments of the present disclosure, the SAM method may be trained easily and applied to various tasks due to its unsupervised and universal nature. First, one natural application may be "one-shot" landmark detection with one labeled template image. On the chest CT dataset, the SAM method may outperform widely used deformable registration methods while being more than 200 times faster. On the X-ray datasets, the SAM method with one labeled template may outperform the supervised HRNet trained on 50 labeled images and the graph convolutional network-based method trained on 5 labeled images. Another application may be lesion matching, which is an important clinical task for radiologists to longitudinally track disease progress. On 1,014 lesion pairs manually annotated in the DeepLesion dataset, the SAM method may outperform previous supervised embedding-based methods (91% versus 82% in accuracy).

According to various embodiments of the present disclosure, the SAM method may be configured to learn pixel-wise anatomical representation from unlabeled radiological images. The SAM method may be used to locate arbitrary body parts with only one labeled template, which is fast, robust to common image variations, and applicable to various image modalities and body parts. The SAM method may outperform registration based methods and supervised methods in few-shot scenarios. Besides universal landmark detection and lesion matching, the SAM method may be used to aid and improve other medical image analysis tasks such as registration, lesion detection, and retrieval, by providing fine-grained location cue, discriminative semantic features, and the like.

In various embodiments of the present disclosure, the problem of universal anatomical embedding learning is tackled for the first time, and discriminative and robust embeddings may be learned in a self-supervised manner; the pixel-level contrastive learning framework is designed with the coarse-to-fine architecture and customized using negative sampling strategies, and the SAM method is easy to train and has a significantly short processing time; and learned embeddings are used in various applications (e.g., landmark detection and lesion matching) on different image modalities of varying body parts, and similar or superior performance is achieved compared to existing registration or supervised methods.

The present disclosure also provides a device for self-supervised anatomical embedding (SAM). The device includes a memory, containing a computer program stored thereon; and a processor, coupled with the memory and configured, when the computer program being executed, to perform a method including: randomly selecting a plurality of images from an unlabeled image batch; and for each image of the plurality of images, performing random data augmentation to obtain a patch pair which is inputted to a neural network; generating global and local embedding tensors for each patch of the patch pair using the neural network; sampling positive pixel pairs and extracting positive embedding pairs for the positive pixel pairs; for each embedding positive pair: computing global and local similarity maps using the global and local embedding tensors; finding global hard negatives using the global similarity maps; sampling global random negatives from a plurality of patch pairs; and pooling the global hard negatives and the global random negatives to obtain final global negatives; and finding local hard negatives using the global and local similarity maps, and randomly sampling final local negatives from the local hard negatives; and further training the SAM method by minimizing a final InfoNCE loss including global and local InfoNCE (info noise contrastive estimation) losses. The global InfoNCE loss is computed using global positive embedding pairs and final global negative embeddings, and the local InfoNCE loss is computed using the local positive embedding pairs and final local negative embeddings.

The present disclosure also provides a computer program product comprising a non-transitory computer-readable storage medium and program instructions stored therein, the program instructions being configured to be executable by a computer to cause the computer to implement operations comprising: randomly selecting a plurality of images from an unlabeled image batch; and for each image of the plurality of images, performing random data augmentation to obtain a patch pair which is inputted to a neural network; generating global and local embedding tensors for each patch of the patch pair using the neural network; sampling positive pixel pairs and extracting positive embedding pairs for the positive pixel pairs; for each embedding positive pair: computing global and local similarity maps using the global and local embedding tensors; finding global hard negatives using the global similarity maps; sampling global random negatives from a plurality of patch pairs; and pooling the global hard negatives and the global random negatives to obtain final global negatives; and finding local hard negatives using the global and local similarity maps, and randomly sampling final local negatives from the local hard negatives; and further training the SAM method by minimizing a final InfoNCE loss including global and local InfoNCE (info noise contrastive estimation) losses. The global InfoNCE loss is computed using global positive embedding pairs and final global negative embeddings, and the local InfoNCE loss is computed using the local positive embedding pairs and final local negative embeddings.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. In certain cases, the numerical values as stated for the parameter can take on negative values.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A self-supervised anatomical embedding (SAM) method for medical images, the method comprising:
   randomly selecting a plurality of images from an unlabeled image batch;
   for each image of the plurality of images,
      performing random data augmentation to obtain a patch pair which is inputted to a neural network;
      generating global and local embedding tensors for each patch of the patch pair using the neural network;
      selecting positive pixel pairs from the patch pair and obtaining positive embedding pairs corresponding to the positive pixel pairs, wherein the positive embedding pairs include global positive embedding pairs and local positive embedding pairs;
   for each positive pixel pair:
      computing global and local similarity maps using the global and local embedding tensors;
      finding global hard negative embeddings using the global similarity maps;
      selecting global random negative embeddings from a plurality of patch pairs; and
   pooling the global hard negative embeddings and the global random negative embeddings to obtain final global negative embeddings; and
      finding local hard negative embeddings using the global and local similarity maps, and randomly sampling final local negative embeddings from the local hard negative embeddings; and
   minimizing a final info noise contrastive estimation (InfoNCE) loss including global and local InfoNCE losses, wherein the global InfoNCE loss is computed using the global positive embedding pairs and the final global negative embeddings, and the local InfoNCE loss is computed using the local positive embedding pairs and the final local negative embeddings.

2. The method according to claim 1, wherein the global and local InfoNCE losses are computed, respectively, according to:

$$L = -\sum_{i=1}^{n_{pos}} \log \frac{\exp(f_i \cdot f_i' / \tau)}{\exp(f_i \cdot f_i' / \tau) + \sum_{j=1}^{n_{neg}} \exp(f_i \cdot h_{ij} / \tau)}$$

wherein L denotes a InfoNCE loss, i denotes an i-th element of positive pixel pairs, $n_{pos}$ denotes a number of positive pixels, $n_{neg}$ denotes a number of negative pixels, $f_i$ denotes an i-th positive embedding in one of the positive embedding pairs, $f_i'$ denotes an i-th positive embedding in the other of the positive embedding pairs, $\tau$ denotes a temperature parameter, and "." denotes an inner production operation.

3. The method according to claim 1, wherein selecting the positive pixel pairs includes:
   when one patch of the patch pair overlaps another patch of the patch pair, randomly selecting the positive pixel pairs from an overlapping area of the one patch of the patch pair and the another patch of the patch pair; and
   when the one patch of the patch pair does not overlap the another patch of the patch pair, randomly sampling the positive pixel pairs from each patch of the patch pair.

4. The method according to claim 1, wherein:
   for each positive pixel pair, randomly selecting one or more negative pixels from the patch pair, wherein a distance between each of the one or more negative pixels and the each positive pixel pair is greater than a preset value.

5. The method according to claim 1, wherein:
   the SAM method generates semantic embeddings for each pixel which describes a corresponding anatomical location or body part.

6. The method according to claim 1, wherein:
   after a point of interest is labeled on a template image, a same body part in other images is located by simple nearest neighbor searching.

7. The method according to claim 2, wherein the final InfoNCE loss is computed according to:

$$L^{final} = L^g + L^l$$

wherein $L^{final}$ denotes the final InfoNCE loss, $L^g$ denotes the global InfoNCE loss, and $L^l$ denotes the local InfoNCE loss.

8. A device for self-supervised anatomical embedding (SAM), comprising:
   a memory, containing a computer program stored thereon; and
   a processor, coupled with the memory and configured, when the computer program being executed, to perform a method including:
   randomly selecting a plurality of images from an unlabeled image batch;
   for each image of the plurality of images,
      performing random data augmentation to obtain a patch pair which is inputted to a neural network;
      generating global and local embedding tensors for each patch of the patch pair using the neural network;
      selecting positive pixel pairs from the patch pair and obtaining positive embedding pairs corresponding to the positive pixel pairs, wherein the positive embedding pairs include global positive embedding pairs and local positive embedding pairs;

for each positive pixel pair:
  computing global and local similarity maps using the global and local embedding tensors;
  finding global hard negative embeddings using the global similarity maps;
  selecting global random negative embeddings from a plurality of patch pairs; and
  pooling the global hard negative embeddings and the global random negative embeddings to obtain final global negative embeddings; and
  finding local hard negative embeddings using the global and local similarity maps, and randomly sampling final local negative embeddings from the local hard negative embeddings; and
minimizing a final info noise contrastive estimation (In-foNCE) loss including global and local InfoNCE losses, wherein the global InfoNCE loss is computed using the global positive embedding pairs and the final global negative embeddings, and the local InfoNCE loss is computed using the local positive embedding pairs and the final local negative embeddings.

9. The device according to claim 8, wherein the global and local InfoNCE losses are computed, respectively, according to:

$$L = -\sum_{i=1}^{n_{pos}} \log \frac{\exp(f_i \cdot f_i' / \tau)}{\exp(f_i \cdot f_i' / \tau) + \sum_{j=1}^{n_{neg}} \exp(f_i \cdot h_{ij} / \tau)}$$

wherein L denotes a InfoNCE loss, i denotes an i-th element of positive pixel pairs, $n_{pos}$ denotes a number of positive pixels, $n_{neg}$ denotes a number of negative pixels, $f_i$ denotes an i-th positive embedding in one of the positive embedding pairs, $f_i'$ denotes an i-th positive embedding in the other of the positive embedding pairs, $\tau$ denotes a temperature parameter, and "." denotes an inner production operation.

10. The device according to claim 8, wherein selecting the positive pixel pairs includes:
  when one patch of the patch pair overlaps another patch of the patch pair, randomly selecting the positive pixel pairs from an overlapping area of the one patch of the patch pair and the another patch of the patch pair; and
  when the one patch of the patch pair does not overlap the another patch of the patch pair, randomly sampling the positive pixel pairs from each patch of the patch pair.

11. The device according to claim 8, wherein:
for each positive pixel pair, randomly selecting one or more negative pixels from the patch pair, wherein a distance between each of the one or more negative pixels and the each positive pixel pair is greater than a preset value.

12. The device according to claim 9, wherein the final InfoNCE loss is computed according to:

$$L^{final} = L^g + L^l$$

wherein $L^{final}$ denotes the final InfoNCE loss, $L^g$ denotes the global InfoNCE loss, and $L^l$ denotes the local InfoNCE loss.

13. A computer program product comprising a non-transitory computer-readable storage medium and program instructions stored therein, the program instructions being configured to be executable by a computer to cause the computer to implement operations comprising:
  randomly selecting a plurality of images from an unlabeled image batch;
  for each image of the plurality of images,
    performing random data augmentation to obtain a patch pair which is inputted to a neural network;
    generating global and local embedding tensors for each patch of the patch pair using the neural network;
    selecting positive pixel pairs from the patch pair and obtaining positive embedding pairs corresponding to the positive pixel pairs, wherein the positive embedding pairs include global positive embedding pairs and local positive embedding pairs;
  for each positive pixel pair:
    computing global and local similarity maps using the global and local embedding tensors;
    finding global hard negative embeddings using the global similarity maps;
    selecting global random negative embeddings from a plurality of patch pairs; and
    pooling the global hard negative embeddings and the global random negative embeddings to obtain final global negative embeddings; and
    finding local hard negative embeddings using the global and local similarity maps, and randomly sampling final local negative embeddings from the local hard negative embeddings; and
  minimizing a final info noise contrastive estimation (In-foNCE) loss including global and local InfoNCE losses, wherein the global InfoNCE loss is computed using the global positive embedding pairs and the final global negative embeddings, and the local InfoNCE loss is computed using the local positive embedding pairs and the final local negative embeddings.

14. The product according to claim 13, wherein the global and local InfoNCE losses are computed respectively according to:

$$L = -\sum_{i=1}^{n_{pos}} \log \frac{\exp(f_i \cdot f_i' / \tau)}{\exp(f_i \cdot f_i' / \tau) + \sum_{j=1}^{n_{neg}} \exp(f_i \cdot h_{ij} / \tau)}$$

wherein L denotes a InfoNCE loss, i denotes an i-th element of positive pixel pairs, $n_{pos}$ denotes a number of positive pixels, $n_{neg}$ denotes a number of negative pixels, $f_i$ denotes an i-th positive embedding in one of the positive embedding pairs, $f_i'$ denotes an i-th positive embedding in the other of the positive embedding pairs, $\tau$ denotes a temperature parameter, and "." denotes an inner production operation.

15. The product according to claim 13, wherein sampling positive pixel pairs includes:
  when one patch of the patch pair overlaps another patch of the patch pair, randomly selecting the positive pixel pairs from an overlapping area of the one patch of the patch pair and the another patch of the patch pair; and
  when the one patch of the patch pair does not overlap the another patch of the patch pair, randomly sampling the positive pixel pairs from each patch of the patch pair.

16. The product according to claim 13, wherein sampling positive pixel pairs includes:
  for each positive pixel pair, randomly selecting one or more negative pixels from the patch pair, wherein a distance between each of the one or more negative pixels and the each positive pixel pair is greater than a preset value.

17. The product according to claim 14, wherein the final InfoNCE loss is computed according to:

$$L^{final}=L^g+L^l$$

wherein $L^{final}$ denotes the final InfoNCE loss, $L^g$ denotes the global InfoNCE loss, and $L^l$ denotes the local InfoNCE loss.

* * * * *